Oct. 24, 1933.  P. HALLOT  1,932,094

AERIAL VEHICLE AND BRAKING SYSTEM THEREFOR

Filed Nov. 13, 1928

INVENTOR
Paul Hallot
BY
ATTORNEY

Patented Oct. 24, 1933

1,932,094

UNITED STATES PATENT OFFICE 1,932,094

AERIAL VEHICLE AND BRAKING SYSTEM THEREFOR

Paul Hallot, Paris, France

Application November 13, 1928, Serial No. 319,179, and in France December 16, 1927

3 Claims. (Cl. 244—2)

The invention relates to a braking system for the landing wheels of aircraft, which allows the maximum degree of braking to be exerted without the danger of locking the wheels, and which at the same time opposes the tendency of the tail to lift after landing. Owing to the risks involved in too powerful braking, and the consequent danger of locking the wheels, the braking of landing wheels of aircraft has not come into extensive general use, despite the undoubted advantages which such braking presents.

When an aeroplane is forced to land in a restricted space, in the event of an engine failure or other mechanical defect, the pilot tends to make too steep a dive in order to shorten the "taxi" of the machine after landing. If the landing is made on unknown and uncertain ground, which often happens in cases of emergency, steep diving is extremely dangerous and often results in damage to the machine. In some cases steep diving is necessary in order to shorten the "taxi" of the machine, as gliding to land at a lesser angle makes the aeroplane travel farther along the ground, and this is undesirable when landing at night or in a restricted space.

Braking of the landing wheels would minimize these dangers, but at the same time injudicious braking would give rise to "tilting", as heavy braking at the incorrect moment would cause the aeroplane to turn about the wheel axle of the undercarriage, thus causing damage to the nose of the fuselage by violent contact with the ground.

To avoid this, the invention provides a system whereby the brakes cannot be applied unless the tail of the machine is in contact with the ground, thus obviating the danger of "tilting". An object of the present invention is to provide a means for holding the tail of the machine down as soon as the aeroplane tends to tilt.

The invention will now be described in greater detail with reference to the accompanying drawing wherein:—

Figure 1:
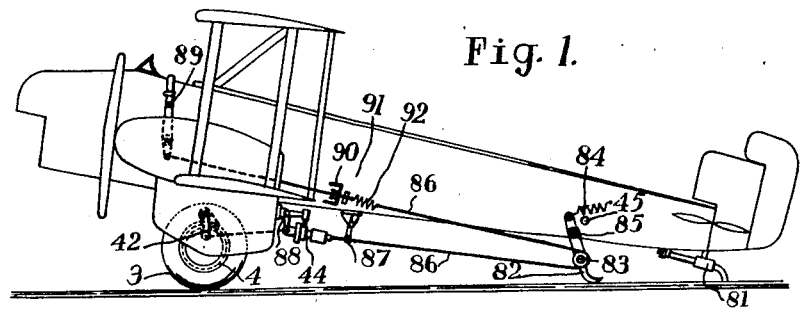
Fig. 1 is a side view of an aeroplane showing a braking system according to the invention.

The arrangement shown in Fig. 1 ensures efficient braking, and at the same time allows braking effects to be applied only during the time the tail skid is on the ground. This is an undoubted advantage as the danger of "tilting" is greatly minimized.

Referring to the figure, 4 represents the wheels of the aeroplane. The tail skid 82 is pivoted at 85, and, when the tail of the machine is off the ground, or when the machine is in flight, is held by spring 84 against the fixed stop 45. The tail skid is provided with a pulley at 83 over which the cable 86 passes. One end of the cable is attached to a control lever 89 in the pilot's cockpit, and the other is connected to compensating device 44 which ensures equal braking effort on both wheels. A second cable connects the compensating device to the brake operating lever 42. Further, a tension spring 92 may be employed to take up the slack in cable 86, and also a stop support 90 and a stop 91 may be arranged on the cable to limit the movement thereof. When the aeroplane is about to land and the wheels touch, but the tail is still off the ground, the pilot applies the brake by means of hand lever 89. Cable 86 is then put under tension, but the only result will be that the spring 92 is extended and the skid 82 is held firmly against its stop 45, and the effort exerted by the pilot will not be transmitted to the brakes. The tail of the plane then lowers gradually, as the machine loses speed, and immediately the skid 82 touches the ground, the full effort exerted by the pilot by means of hand lever 89 takes effect on the brake drums. This is caused by the tail-skid pivoting about the pivot 85 and tensioning the cable 86. If now, the tail rises as a result of braking the wheels, the skid 82 leaves the ground, and the brakes are released due to the skid being pulled once again against the stop 45, thus slackening the cable 86. The brake operating lever then returns to the non-operative position and brings about the withdrawal of the brake shoes from the drum S. In the case where slight braking efforts are put on the wheels by the pilot before landing they do not reach their full value till the tail skid touches the ground. This obviates the necessity of the pilot deciding when the brakes should be applied, and they can therefore be pre-set by the lever 89, before the machine lands, the pilot thus being able to give his whole attention to maneuvering the machine on the ground.

Figure 2:
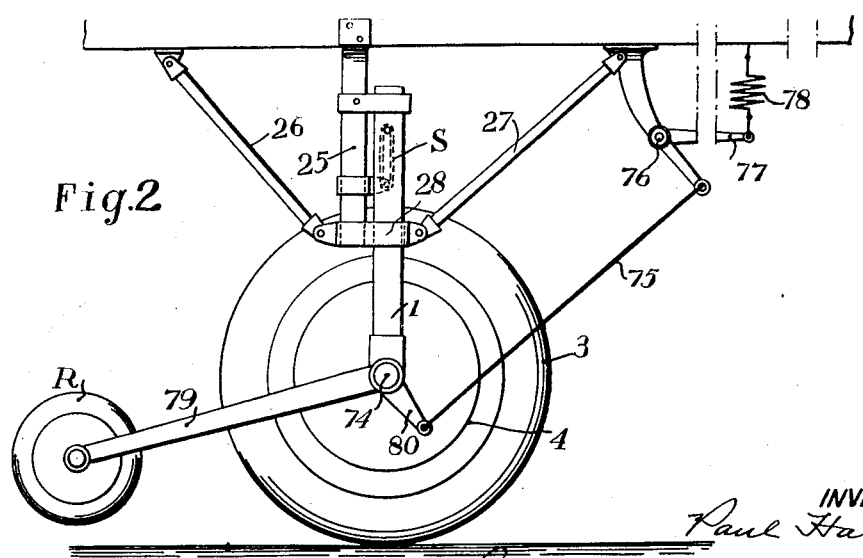
Figure 2 shows an arrangement for opposing the tendency of the machine to tilt.

The arrangement described may be combined with the arrangement shown in Fig. 2 for the purpose of double safety. This figure shows the undercarriage of the aeroplane in which the wheel 4, provided with a tyre 3, is mounted on the axle 74 carried by the undercarriage strut 1. The strut 1 is connected through shock absorbing means S to the support 25, which is braced by struts 26 and 27, attached to the underside of the fuselage. Member 28 connects the struts or supports 25, 26 and 27 at their lower ends, and has an aperture through which the strut 1 passes, and is slidably constrained therein. The arm 79 is pivoted about the axle 74 and extends so as to project some distance in front of the wheel 4. The arm 80 is rigidly connected to the arm 79 to form a bell-crank lever and is coupled through the cable 75 to a second bell-crank lever 77, pivoted at 76. The long arm of this latter bell-crank lever extends some way along the underside of the fuselage and is coupled thereto at its extremity by spring 78. The lever 79 carries at its front end a small leading wheel R, but this, of course, can be replaced by a skid or other suitable device.

The method of operation of the arrangement according to this figure is as follows:—

When the machine lands, the shock is taken up by the shock absorber S, the strut 1 sliding upwards in the guide 28. The small leading wheel R also touches the ground in front of the leading wheel 4 and through the lever system, tensions the spring 78 and tends to turn the machine about the axle 74 in the direction opposite to that of tilting, the brake being simultaneously applied by the combined action of the shock absorber S and the displacement of the lever 80. It can easily be seen that such an arrangement guarantees a short "taxi" over the ground after landing and that the machine can be brought to rest in a more restricted space than has hitherto been possible.

The actual construction of the brake itself may be of any suitable form, but it preferably comprises the usual drum brake provided internally with articulated segments adapted to be expanded by means of a cam or similar mechanism to contact with the surface of the drum.

The devices which have been described above have been described only by way of example, and practical modifications may be made without departing from the scope of the present invention which is only limited by the scope of the appended claims.

I claim:—

1. A braking system for aeroplanes comprising a pair of landing wheels rotatably mounted on an axle, shock absorbing means for supporting said axle on the undercarriage of the aeroplane, brakes between said wheels and said axle, means for operating said brakes, a bell-crank lever pivotally mounted under the fuselage of the aeroplane, one arm extending substantially parallel to and the whole length of the fuselage, a spring interconnecting the free end of said long arm with the tail end of the fuselage, and means for pulling on the other arm of the bell-crank lever to hold the tail on the ground when the aeroplane tends to tilt.

2. A braking system for aeroplanes comprising a pair of landing wheels rotatably mounted on an axle, shock absorbing means for supporting said axle on the undercarriage of the aeroplane, brakes between said wheels and said axle, means for operating said brakes, a bell-crank lever pivotally mounted under the fuselage of the aeroplane, one arm extending substantially parallel to and the whole length of the fuselage, a spring interconnecting the free end of said long arm with the tail end of the fuselage, a lever extending forward of the undercarriage, and connective means between said lever and the other arm of said bell-crank lever, so that when the tail tends to lift said lever engages with the ground and tends to pull the tail down again.

3. A braking system for aeroplanes as claimed in claim 2, wherein said lever extending forward of the undercarriage is provided at its free end with a small wheel.

PAUL HALLOT.